US00RE37278E

(19) United States
(12) Reissued Patent
Forsberg

(10) Patent Number: US RE37,278 E
(45) Date of Reissued Patent: Jul. 17, 2001

(54) RETAINING WALL BLOCK

(75) Inventor: Paul J. Forsberg, Prior Lake, MN (US)

(73) Assignee: Keystone Retaining Wall Systems, Edina, MN (US)

(21) Appl. No.: 08/076,290

(22) Filed: Jun. 11, 1993

Related U.S. Patent Documents

Reissue of:
(64) Patent No.: 4,802,320
Issued: Feb. 7, 1989
Appl. No.: 07/116,228
Filed: Nov. 3, 1987

U.S. Applications:
(63) Continuation of application No. 07/652,833, filed on Feb. 6, 1991, now abandoned, which is a continuation of application No. 06/907,077, filed on Sep. 15, 1986, now abandoned.

(51) Int. Cl.[7] ..... E04C 1/00
(52) U.S. Cl. ..... 52/585.1; 52/604; 52/607; 52/608
(58) Field of Search ..... 52/604, 606, 608, 52/609, 611

(56) References Cited

U.S. PATENT DOCUMENTS 126,547 * 5/1872 Hickcox .
228,052 * 5/1880 Frost .

(List continued on next page.)

FOREIGN PATENT DOCUMENTS

205452 * 12/1939 (CH) .
2414202 10/1975 (DE) .
3401629 * 7/1984 (DE) ..... 52/606
170113 2/1986 (EP) .
392474 * 11/1908 (FR) .
1360872 * 4/1964 (FR) .
2216823 8/1974 (FR) .
336-2 * 12/1871 (GB) ..... D25/113
1385207 * 12/1974 (GB) .
2127872A * 12/1984 (GB) .
84735 6/1920 (SE) .

OTHER PUBLICATIONS

Standard Load Bearing Wall Tile; p. 11; The Hollow Building Tile Assoc. Jan. 1924.*
Concrete Masonry Pictorial, vol. 33, No. 3C; 1977; p. 35.*
Standard Load Bearing Wall Tile; 1924, The Hollow Building Tile Assoc.*
Paving Stone New Look with Old World Charm; Besser Co. Bulletin—Feb. 1985.*
"How Big Is A Block" from May–Jun. 1972 issue of Building Standards.

*Primary Examiner*—Michael Safavi

(57) ABSTRACT

A retaining wall is made from a plurality of blocks arranged in rows superimposed on each other and pinned together. Each block has a body with an exterior face and rearwardly diverging side walls joined to a neck. A head having outwardly directed ears is joined to the neck. The body has holes and pockets for pins that interlock overlapped blocks together.

42 Claims, 8 Drawing Sheets

U.S. PATENT DOCUMENTS

| | | | | |
|---|---|---|---|---|
| D. 237,704 | * | 11/1975 | Lane . | |
| 566,924 | * | 9/1896 | Morrin . | |
| 810,748 | * | 1/1906 | Haller et al. . | |
| 1,092,621 | * | 4/1914 | Worner . | |
| 1,414,444 | * | 5/1922 | Straight . | |
| 1,456,498 | * | 5/1923 | Binns . | |
| 1,727,363 | * | 9/1929 | Bone | 52/609 |
| 2,011,531 | * | 8/1935 | Tranchell | 52/606 |
| 2,235,646 | * | 3/1941 | Schaffer . | |
| 2,882,689 | * | 4/1959 | Huch et al. . | |
| 2,963,828 | * | 12/1960 | Belliveau . | |
| 3,036,407 | | 5/1962 | Dixon . | |
| 3,252,287 | | 5/1966 | Suzuki . | |
| 3,274,742 | * | 9/1966 | Paul et al. . | |
| 3,390,502 | * | 7/1968 | Carroll . | |
| 3,430,404 | * | 3/1969 | Muse . | |
| 3,557,505 | * | 1/1971 | Kaul . | |
| 3,936,987 | * | 2/1976 | Calvin . | |
| 3,995,434 | * | 12/1976 | Kato et al. . | |
| 4,016,693 | | 4/1977 | Warren . | |
| 4,110,949 | * | 9/1978 | Cambiuzzi et al. . | |
| 4,207,718 | * | 6/1980 | Schaaf et al. . | |
| 4,208,850 | * | 6/1980 | Collier . | |
| 4,228,628 | * | 10/1980 | Schlomann . | |
| 4,229,123 | * | 10/1980 | Heinzmann . | |
| 4,312,606 | * | 1/1982 | Sarikelle . | |
| 4,324,508 | | 4/1982 | Hilfiker et al. . | |
| 4,335,549 | * | 6/1982 | Dean, Jr. . | |
| 4,454,699 | * | 6/1984 | Strobl . | |
| 4,496,266 | | 1/1985 | Ruchstuhl . | |
| 4,524,551 | * | 6/1985 | Schweiwiller . | |
| 4,572,699 | * | 2/1986 | Rinninger . | |
| 4,658,541 | | 4/1987 | Halle . | |

* cited by examiner

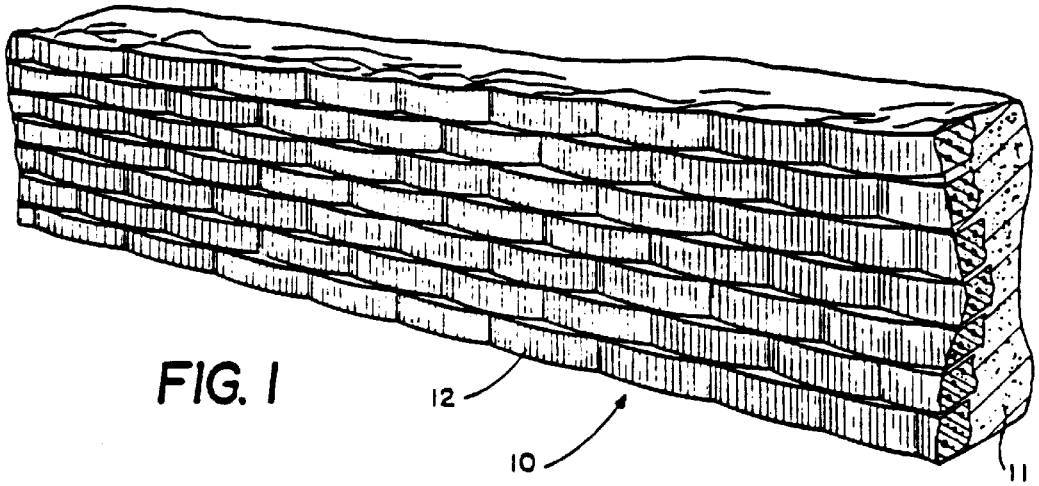
FIG. 1
FIG. 7
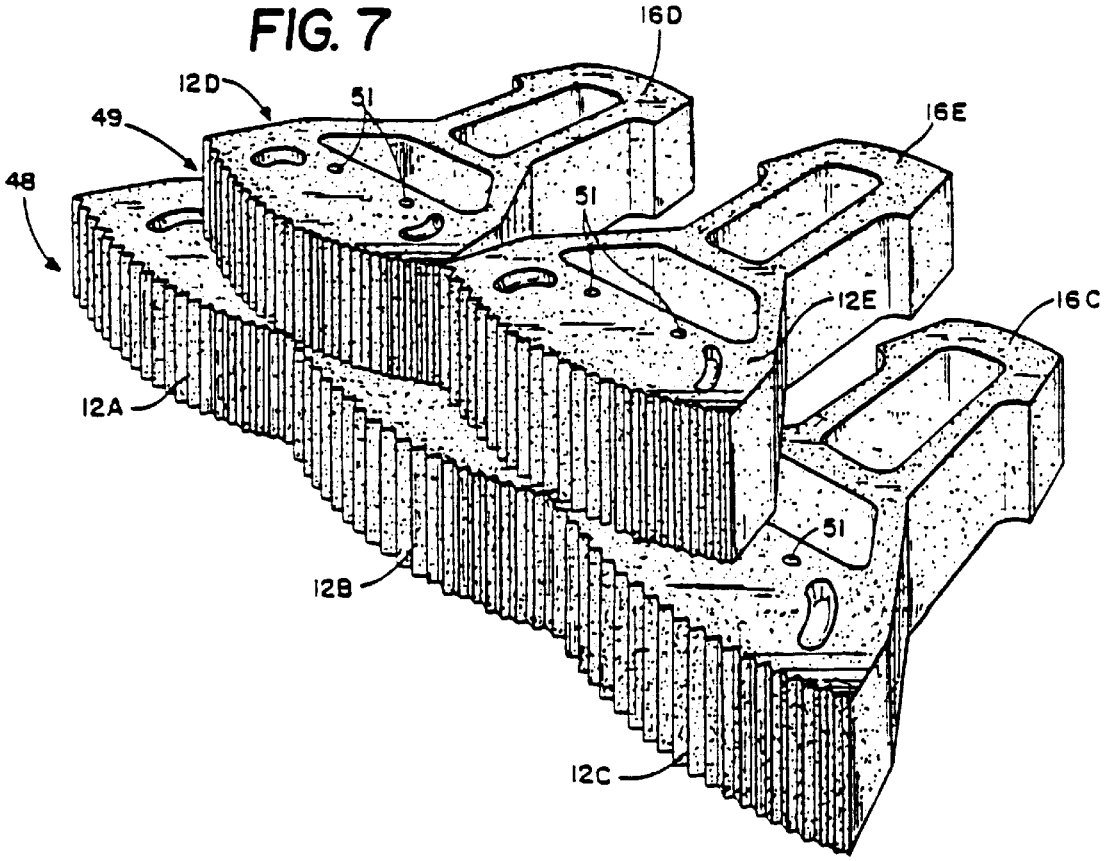

RETAINING WALL BLOCK

Matter enclosed in heavy brackets [ ] appears in the original patent but forms no part of this reissue specification; matter printed in italics indicates the additions made by reissue.

This *is a continuation of reissue application Ser. No. 07/652,833, filed Feb. 6, 1991, now abandoned, which is a reissue application of U.S. Pat. No. 4,802,320 which* is a continuation of application Ser. No. 907,077 filed Sept. 15, 1986, now abandoned.

FIELD OF INVENTION

This invention is directed to the field of wall blocks and block wall construction. The blocks are of the type used to make inclined retaining walls to secure terraces and embankments.

BACKGROUND OF INVENTION

Conventional retaining walls are used to secure earth embankments against sliding and slumping. Retaining walls are made of various types of concrete, solid masonry, wood ties, bricks, and blocks of stone and concrete. The blocks are placed in rows and superimposed on top of each other to form a wall. Examples of blocks used in the construction of retaining walls are shown by Heinzmann in U.S. Pat. No. 4,229,123 and Scheiwiller in U.S. Pat. No. 4,524,551. These patents disclose a plurality of block elements stacked on each other and located in rows to form retaining walls. The block elements have tongue and groove structures which allow adjacent rows of blocks to interengage each other to form generally upright walls. The block elements also have hollow interiors with open tops and bottoms for accommodating soil and plants. Solid walls use considerable amounts of material. They are also expensive and require considerable time and labor to construct. Block walls are satisfactory where the pressure behind the wall is not too great or the slope not to steep as the blocks are not connected together. The disadvantages of the prior retaining walls are overcome with the wall blocks of the present invention.

SUMMARY OF INVENTION

The invention relates to a retaining wall block for constructing a wall structure with a plurality of wall blocks interconnected together. The wall blocks are placed side-by-side and stacked on top of each other to form the wall structure. The wall structure can have a variety of shapes, such as linear, concave and convex curved, serpentine and circular to conform to the landscape utilization. The wall block can be made in miniature form and used as a construction toy. The wall structure is made of blocks formed from high density concrete. Each block has an attractive and decorative exterior face. A wall structure can be made with a plurality of interlocking wall blocks without the use of special tools with a minimum of time and labor. The wall block when used to construct a retaining wall is self-anchoring and provides an effective structure to retain the earth, including steep slopes, in a desired location.

The retaining wall block has a body that has a convex curved front face which is the exterior surface of the block. The external face of the block can be smooth, serrated, horizontally grooved, vertically grooved, diagonally grooved, checkerboard or have an aggregate appearance. The block can be made of high density concrete that may be of any desired color including gray or earth tones and the like. The body has generally flat top and bottom surfaces so that the rows of blocks can be stacked or superimposed on top of each other. The adjacent rows of blocks are connected together with pins. Each block has holes to accommodate the pins. Rows of blocks overlap each other so that each block is pinned to a pair of adjacent blocks.

In one embodiment of the retaining wall block, the body of the block has a pair of pockets located adjacent the opposite side walls thereof. The side walls extend rearwardly and taper inwardly from opposite ends of the front face. Holes located adjacent the pockets are used to accommodate pins that interconnect the adjacent courses of blocks set together. The side walls of the body are joined to a neck that terminates in the head. The head has oppositely directed anchoring ears. In addition to the anchoring ears, the body and neck are provided with upright openings to accommodate fill to facilitate the retention of the wall blocks in an earth embankment. The wall blocks of adjacent courses of the wall structure overlap each other. Pins extended through the holes in the body project into the pockets of the adjacent blocks to interlock the wall blocks together. The objects and advantages of the wall block and wall structure of the invention and additional advantages thereof are embodied in the drawings and following detailed description thereof.

DESCRIPTION OF DRAWING

FIG. 1 is a perspective view of a retaining block wall constructed according to the invention;

FIG. 7 is a top perspective view of a portion of the wall of FIG. 1 showing the overlapped rows of wall blocks;

DESCRIPTION OF PREFERRED EMBODIMENTS

Referring to FIG. 1, there is shown a retaining block wall indicated generally at 10 located adjacent a bank of earth 11.

Wall 10 comprises a plurality of overlapping blocks 12 that are interlocked together. The blocks are located in rows which are superimposed on each other. Blocks 12 used to make earth retaining walls and residential and commercial landscape walls which can have linear as well as convex and concave shapes. Block 12 is a high density one-piece concrete member that is dense, strong, and rugged. The blocks can be made of other rigid construction materials, such as plastic, plastic reinforced with fibers, ceramic, brick, wood, and metal. The following description of block 12 is directed to a concrete block.

Figure 2:
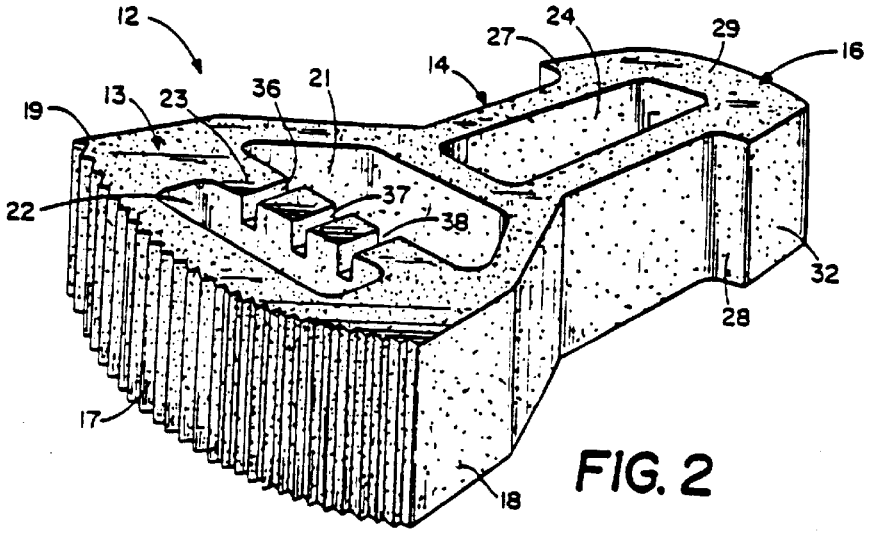
FIG. 2 is a perspective view of a block showing the bottom thereof used to construct the wall of FIG. 1.
Figure 3:
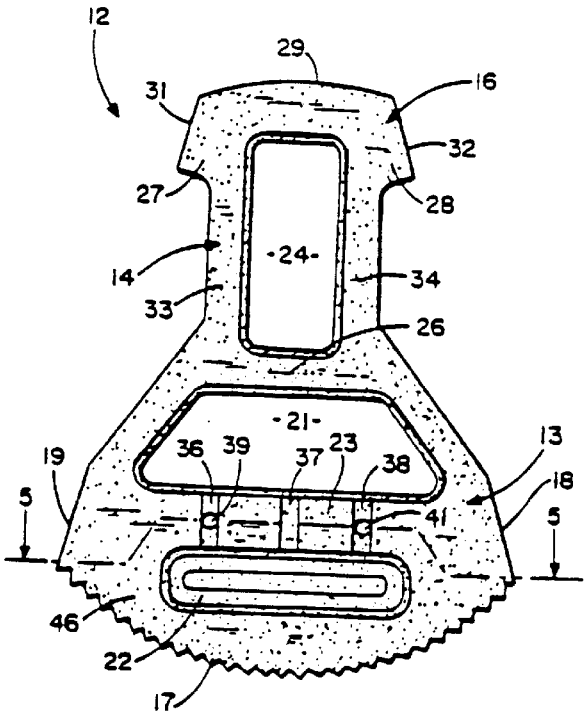
FIG. 3 is a bottom view of the block of FIG. 2.
Figure 4:
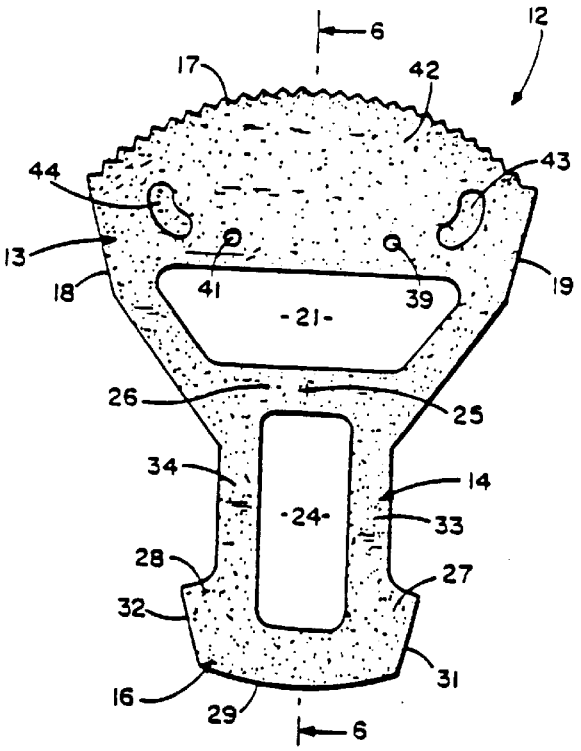
FIG. 4 is a top view of the block of FIG. 2.

As shown in FIGS. 2 to 4, block 12 has a body 13 joined to a neck 14. A head 16 is joined to the inner end of neck 14. Body 13, neck 14, and head 16 form a one-piece concrete block. Body 13 has a convex shaped exterior front face or front wall 17. Face 17 has a convex arcuate shape with a radius center 25 located along the mid line of the block at the longitudinal center of the block. Face 17 has a plurality of vertically spaced ribs. Exterior face 17 can have face patterns that are smooth, serrated, horizontally grooved, vertically grooved, diagonally grooved, checkerboard, or have an aggregate surface. Examples of the types of outer surface configurations on the exterior face 17 are shown in U.S. Pat. No. Des. 297,464. The block disclosed in U.S. Pat. No. Des. 297,464 is incorporated herein by reference.

Body 13 has inwardly converging side walls 18 and 19 that converge to neck 14. Each side wall has an obtuse angular shape that converges from an end of front face 17 to neck 14. A transverse opening 21 having a generally trapezoidal shape is located between side walls 18 and 19. A transverse rectangular recess 22 is located between opening 21 and face 17. Recess 22 extends downwardly from the top of block 12 toward the bottom thereof. The bottom of recess 22 is open. An upright web 12 separates recess 22 from opening 21.

Neck 14 and head 16 have a common linearly elongated opening 24. Opening 24 has a rectangular shape orientated perpendicular or normal to opening 21. A short center web 26 separates opening 24 from opening 21. The block center 25 is located in web 26.

Head 16 has a pair of side ears 27 and 28 that extend forwardly from opposite ends of the convex curved end wall 29. End wall 29 is a convex arcuate wall having a radius center at block center 25. The radius of curvature of face 17 is the same as wall 29 as they are equidistant from block center 25. Ears 27 and 28 have rearwardly diverging side walls 31 and 32 that are generally in alignment with side walls 18 and 19 of body 13. Ears 27 and 28 extend outwardly in opposite direction from the neck walls 33 and 34 to facilitate the anchoring or holding of the block in soil, sand, gravel and the like.

Figure 5:
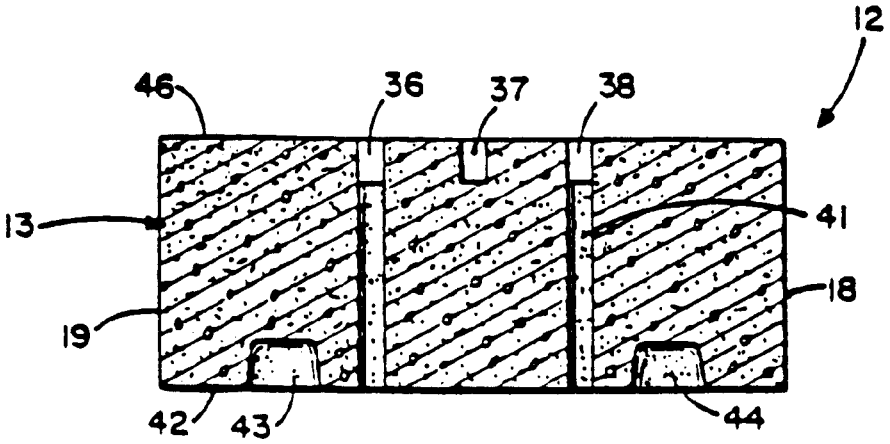
FIG. 5 is a sectional view taken along the line 5—5 of FIG. 3.
Figure 6:
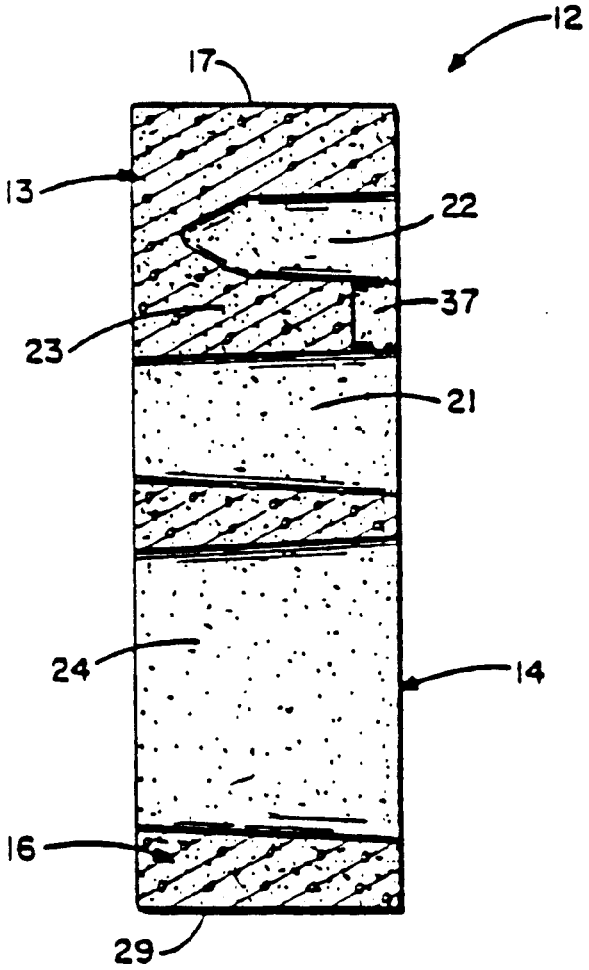
FIG. 6 is a sectional view taken along the line 6—6 of FIG. 4.
Figure 8:
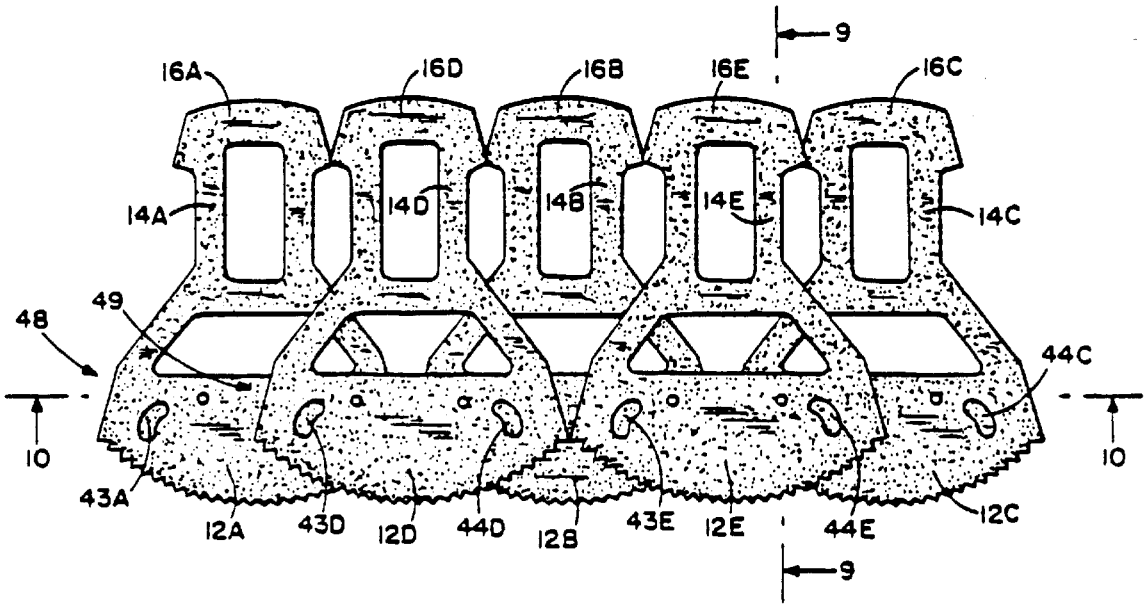
FIG. 8 is a top view of FIG. 7.

As shown in FIGS. 2 and 3, web 23 has grooves 36, 37, and 38 open to the bottom surface 46 of block 12 to allow water to drain from recess 22. A pair of holes 39 and 41 extend into head 16 from the bottom of grooves 36 and 38, as seen in FIG. 5. Holes 39 and 41 extend through head 16 and accommodate pins 51 and 52 that interlock layers of blocks together.

As shown in FIGS. 4 and 5, a pair of cup-shaped pockets or recesses 43 and 44 are located in body 13. Pockets 43 and 44 are open to the top surface 42 and are spaced outwardly from holes 39 and 41. As shown in FIG. 4, pockets 43 and 44 have generally arcuate shapes and extend outwardly toward face 17. The inner ends of pockets 43 and 44 are in general transverse alignment with holes 39 and 41. The pockets can be open to the bottom surface 46 of body 13. *Accordingly, a portion of each of the pockets 43 and 44 and the holes 39 and 41 intersect a straight line extending in a lateral direction across the block.*

As shown in FIGS. 7 to 10, wall 10 comprise a plurality of layers or courses of blocks. Two block layers 48 and 49 are shown in FIGS. 7 to 10. Additional layers of blocks are used to complete the wall to the desired height. The lower layer 48 comprises blocks 12A, 12B, and 12C. The top layer 49 comprises blocks 12D and 12E. Blocks 12A–12E are identical to block 12 shown in FIGS. 2 to 6. The parts of block 12 that correspond with the parts of blocks 12A to 12E have the same reference numbers with the suffixes A to E. The heads of each block with their outwardly directed ears anchor the block in the earth. Additional anchoring of the block is achieved with 49 located in openings 21 and 24.

Figure 9:
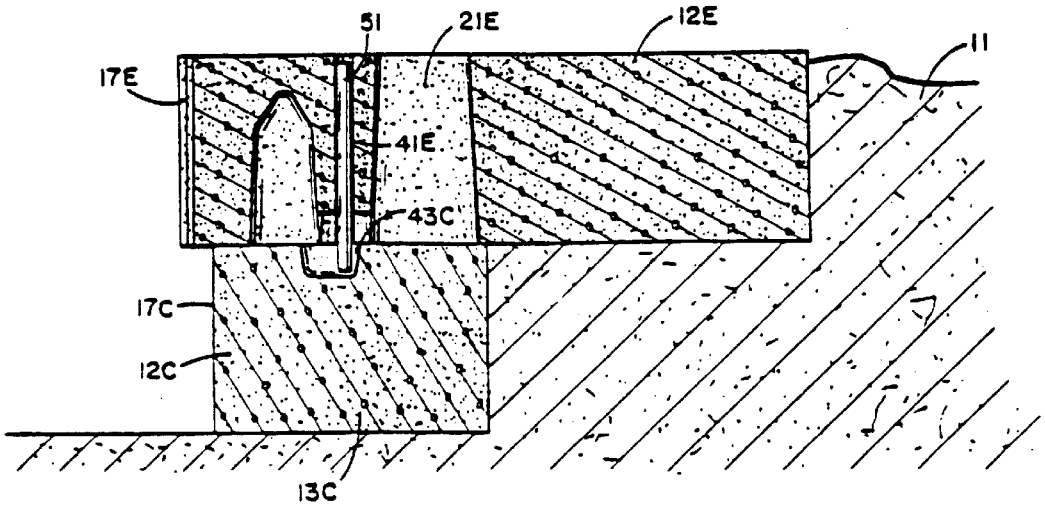
FIG. 9 is an enlarged sectional view taken along the line 9—9 of FIG. 8.
Figure 10:
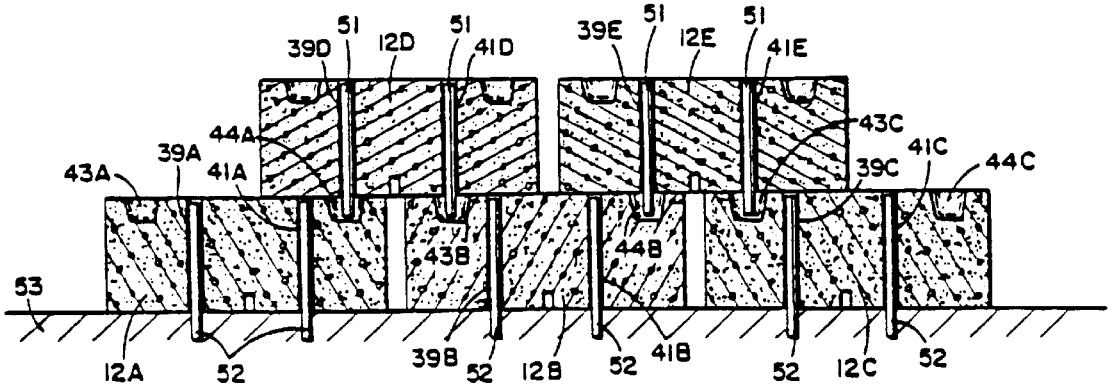
FIG. 10 is a sectional view taken along the line 10—10 of FIG. 8.
Figure 12:
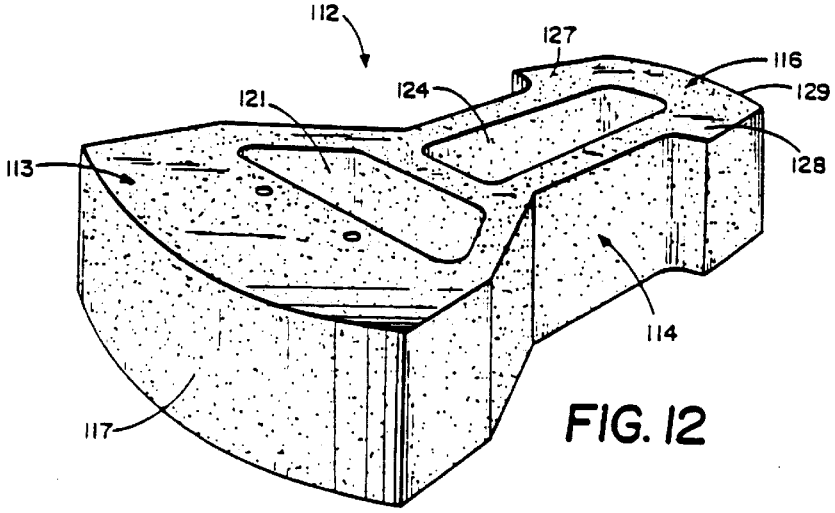
FIG. 12 is a perspective view of a modification of the block showing the top thereof used to construct a wall according to the invention.

A plurality of upright pins 51 interlock the row of blocks 12A, 12B, and 12C to the row of blocks 12D and 12E. Pins 51 are rigid rods made of metal or reinforced plastic, such as glass fiber impregnated plastic. As shown in FIG. 10, pins 52 extend downwardly into ground 53 and are located in holes 39A, 39B, 39C and 41A, 41B, 41C. The lower end of pins 51 project into pockets 43B, 43C and 44A, 44B of blocks 12A, 12B, and 12C. The pocket 43C having a generally arcuate shape allows block 12E to be longitudinally positioned on top of block 12C in a desired position. As shown in FIG. 9, the front face 17E is offset rearwardly from the front fact 17C of block 12C. FIG. 10 shows the remaining pins 51 interlocking the stacked blocks together. A second set of pins mounted in holes in a third layer of blocks fit into the pockets 43D, 44D, 43E and 44E. Additional pins are used to interlock additional layers of blocks of wall 10. Alternate layers of blocks are positioned in overlapping relation so that each block is pinned to two blocks. This holds the rows of blocks together in side-by-side locations and previous individual blocks from moving out away from the fill. The pins 51 and 52 and additional pins in cooperation with the pockets in the blocks allow adjacent blocks and layers of blocks to be located in linear, convex, and concave curved relationships. The layers of blocks can be vertically aligned on top of each other to form a generally vertical wall. Alternatively, the layers of blocks can be stepped or offset rearwardly to form rearwardly stepped upright wall.

Figure 11:
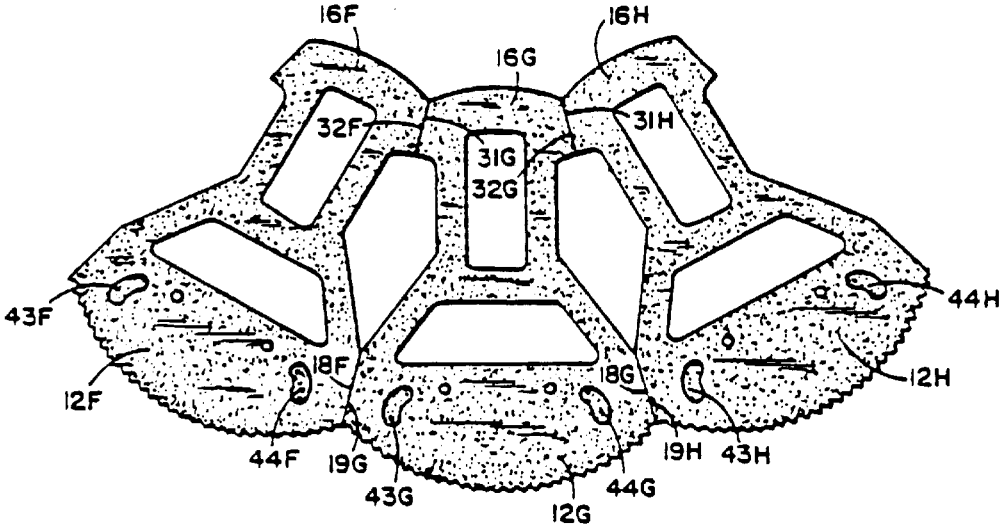
FIG. 11 shows an arrangement of the wall blocks to form a convex curved wall.

As shown in FIG. 11, blocks 12F, 12G, and 12H are identical to block 12. They are located in a convex curved arrangement. The adjacent side walls 18F, 19G, and 18G, 19H are located in engagement with each other. This positions the adjacent side walls 32F, 31G and 32G and 31H in engagement with each. Each layer of blocks can have a convex curved configuration to from a convex curved wall.

A modification of the wall block, indicated generally as 112, is shown in FIGS. 12 to 17. Block 112 is similar in shape and form to block 12. Block 112 has a body 113 joined to a neck 114. The outer end of neck 114 is integrally attached to an enlarged head 116 which forms anchoring structure for the block. Body 113, neck 114, and head 116 are a one-piece concrete block. The block 112 is made of high strength high density semi-wet molded concrete. Other materials, such as plastic, ceramic, wood, and metal can be used to make block 112.

Body 113 has a convex shaped exterior front face or front wall 117. Face 117 has a convex arcuate shape with a radius center 125 located along the mid-line of the block at the longitudinal center of the block. Face 117 is shown as having a smooth face pattern. Other types of face patterns such as vertical or horizontal scored, ribbed, exposed aggregate and the like can be used with the block.

Body 113 has inwardly converging side walls 118 and 119 that are joined to neck 114. Each side wall 118 and 119 has an obtuse angular shape that converges from an end of front face 117 to neck 114. A transverse opening 121 having a generally trapezoidal shape is located between side walls 118 and 119. A transverse generally rectangular recess 122 is located between opening 121 and face 117. Recess 122 extends downwardly from below the top of the block toward the bottom. The bottom of recess 122 is open. An upright web 123 separates recess 122 from opening 121. Neck 114 and head 116 have a generally radial rectangular shaped opening 124 orientated perpendicular or normal to opening 121. A short center web 126 separates opening 124 from opening 121. Block center 125 is located in the mid-section of the web 126

Head 116 has a pair of outwardly directed side ears 127 and 128 and a convex arcuate end wall 129. The radius of curvature of face 117 and end wall 129 is the same as they are equal distance from block center 125. Each 127 and 128 extend outwardly in opposite directions from the neck side walls 131 and 132 respectively and form separate anchoring surfaces that cooperate with the compacted, granular fill, such as coarse sand, pea gravel, and the like, surrounding block 112 to anchor it in the fill.

Figure 13:
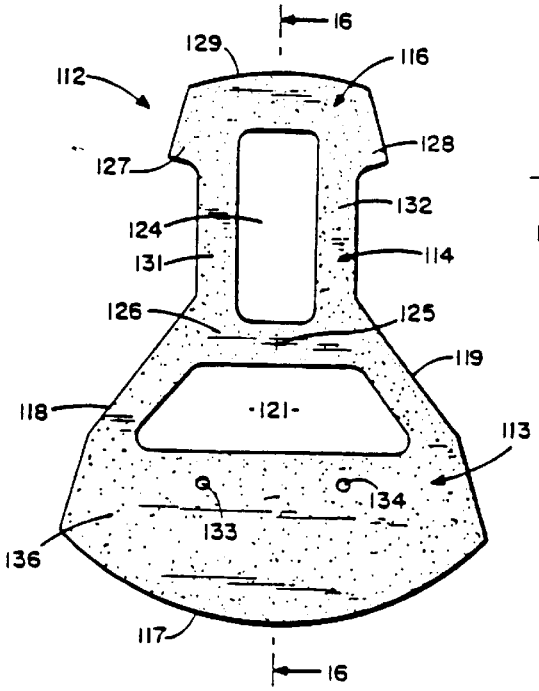
FIG. 13 is a top view of the block of FIG. 12.
Figure 14:
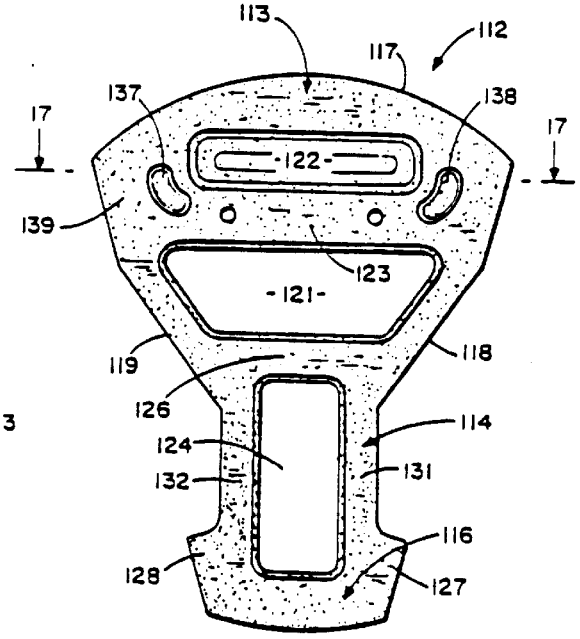
FIG. 14 is a bottom view of the block of FIG. 12.
Figure 15:
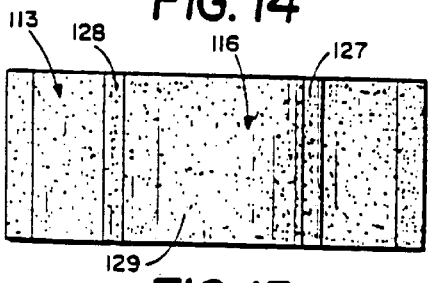
FIG. 15 is a rear elevational view of the block of FIG. 12.
Figure 16:
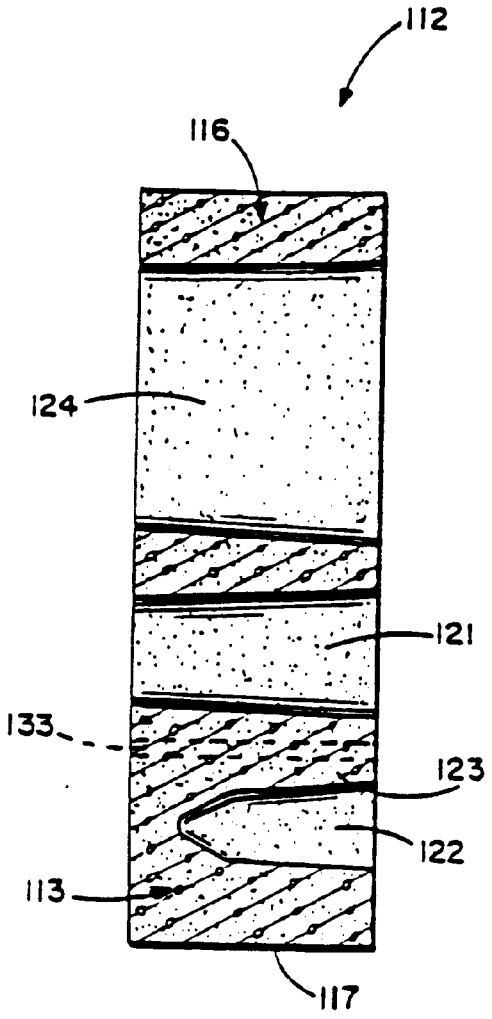
FIG. 16 is a sectional view taken along the line 16—16 of FIG. 13.
Figure 17:
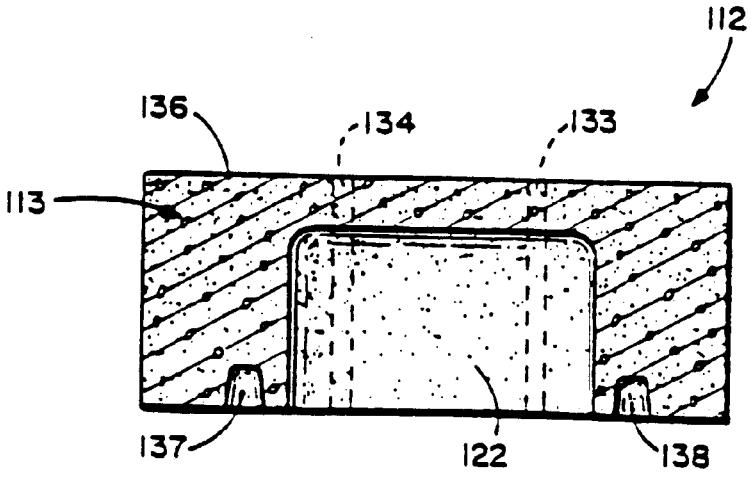
FIG. 17 is a sectional view taken along the line 17—17 of FIG. 14.
Figure 18:
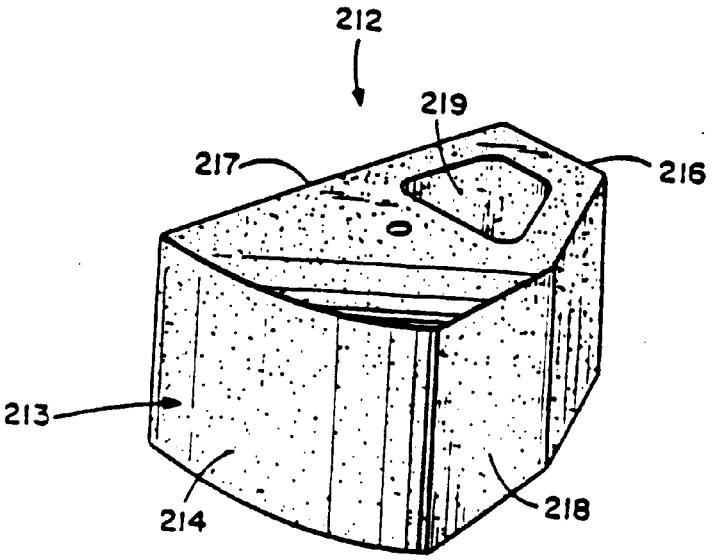
FIG. 18 is a perspective view of a starter block used in a retaining wall of the invention.
Figure 19:
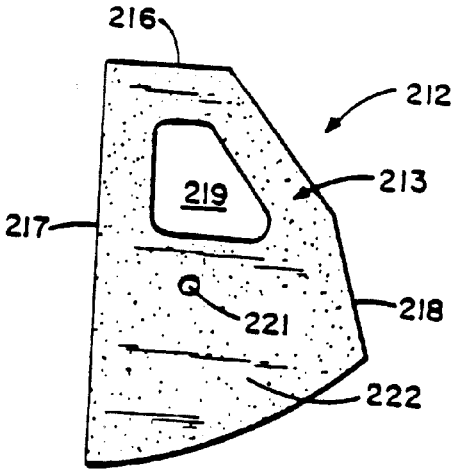
FIG. 19 is a top view of FIG. 18.

As shown in FIGS. 13 and 14, a pair of holes 133 and 134 extend through body 113 and are adapted to accommodate pins such as pins 51 and 52 used to interlock layers of blocks together. Preferably, the pins are glass fiber rods that fit into holes 133 and 134. The upper ends of the rods extend above the top surface 136 of block 112 and are adapted to fit into pockets or cup-shaped recesses 137 and 138 located in the bottom surface of the adjacent stacked block. As shown in FIG. 14, pockets 137 and 138 have generally arcuate shapes and are located adjacent opposite ends of web 123. Pockets 137 and 138 are open to the bottom surface 139 of block 112.

A wall is made of a plurality of layers or courses of blocks 112. Preferably, the wall is located on a layer of compacted granular fill. The upright rods are forced into holes 133 and 134. The upper ends of the rods project into the pockets in the bottom of blocks to locate and interlock adjacent layers of blocks together. The rods when located in the pockets limit outward and lateral movement of the blocks relative to each other. The layers of blocks can have a set back of about one half inch per course. Reinforcing tiebacks, such as earth auger tiebacks, can be used with high retaining walls. Wall backfill is placed behind the wall for each layer of blocks. All voids in the blocks are filled with granular fill, such as well draining compactable granular fill or pea gravel.

Figure 20:
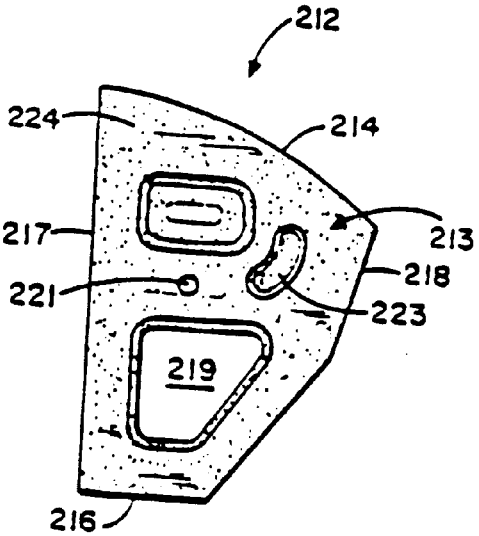
FIG. 20 is a bottom view of FIG. 18.
Figure 21:
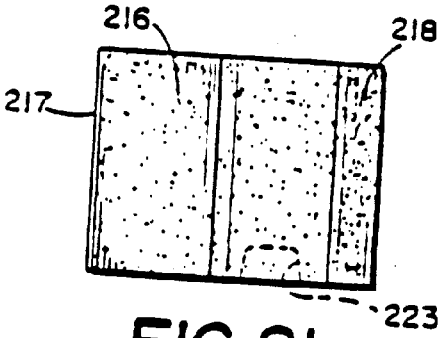
FIG. 21 is a rear elevational view of FIG. 18.

Referring to FIGS. 18 to 21, there is shown a starter block or module, indicated generally at 212, used to start a wall adjacent a vertical surface, such as a side of a building wall or the like. Block 212 has a body 213 with a convex curved front face 214. Face 214 has a vertical groove pattern that corresponds with the pattern of the remaining blocks of the wall. The opposite end of body 213 has a rear wall 216 joined to a straight side wall 217 and an obtused angled side wall 218. Side wall 218 conforms to the shape and size of the side wall 18 of the block 12. Body 213 has an opening 219 and a hole 221 open to the top surface 222 thereof. As shown in FIG. 20, the bottom of block 212 has a arcuate shaped pocket 223 open to the bottom surface 224. The starter blocks are made as right hand blocks and left hand blocks. The left hand blocks are the mirror image of the right hand blocks.

While there has been shown and described preferred embodiments of the retaining wall blocks of the invention, it is understood that changes in the shape, structure, and form, as well as materials may be made by those skilled in the art without departing from the invention. The invention is defined in the following claims.

The embodiments of the invention in which an exclusive property or privilege is claimed are defined as follows:

1. A retaining wall block comprising:

a body including a convex curved front face having opposite ends, a generally flat top surface, a generally flat bottom surface spaced from and extended generally parallel to the top surface and side walls extended between said top and bottom surfaces rearwardly and inwardly from the opposite ends of the front face, said body having a first generally elongate pocket and a second generally elongate pocket open to the bottom surface thereof, said first pocket being located adjacent one of said side walls, said second pocket being located adjacent the other of said side walls, and a pair of holes extended vertically through said body adapted to accommodate pins having ends projected from the body said holes having opposite ends open to said top and bottom surfaces of the body one of said holes being located inwardly of and adjacent said first pocket, the other of said holes being located inwardly of and adjacent said second pocket whereby the ends of the pins projected from the body are adapted to extend into pockets of similar adjacent retaining wall blocks having front faces and locate the front faces of the adjacent retaining wall blocks offset inwardly of the front face of the retaining wall block, a recess open to the bottom surface of the body spaced inwardly from said convex curved front face thereof, a first opening vertically through said body spaced inwardly from said recess, a web separating said recess from said first opening, said holes being located through said web, said pockets being located adjacent opposite ends of said web, a neck joined to the side walls and extended rearwardly therefrom, said neck having a width smaller than the length of said front face, a head joined to the neck, said head having ears projected laterally from opposite sides of the neck, said neck and head having a second opening extended vertically therethrough, and a second web separating the first opening from the second opening.

2. The wall block of claim 1 wherein: said front face has a plurality of grooves.

3. The wall block of claim 2 wherein: said grooves are generally vertical grooves.

4. The wall block of claim 1 wherein: said first opening has a generally trapezoidal shape and said second opening has a rectangular shape.

5. The retaining wall block of claim 1 wherein: said pockets are larger than the holes and extend outwardly toward opposite portions of the front face of said body.

6. The retaining wall block of claim 1 wherein: said pockets are layer than the holes and extend outwardly toward opposite portions of the front face of said body, each of said pockets having inner ends, said pair of holes comprising a first hole located adjacent the inner end of the first pocket and a second hole located adjacent the inner end of the second pocket.

7. The wall block of claim 1 wherein: said head has side walls linearly aligned with the side walls of the body.

8. The retaining wall block of claim 1 wherein: each of said pockets has an arcuate shape larger than the holes and extends outwardly toward the front face of the body.

9. The wall block of claim 1 wherein: said head has a convex end wall extended between said ears.

10. The retaining wall block of claim 1 wherein: each of said pockets have inner ends, said pair of holes comprising a first hole located adjacent the inner end of the first pocket and a second hole located adjacent the inner end of the second pocket, said inner ends of the pockets being located in general transverse alignment with said holes.

11. A retaining wall block comprising:

a body including a front face having opposite ends, a top surface, a bottom surface, and side walls extended between said top and bottom surfaces rearwardly and inwardly from the opposite ends of the front face, said body having a first generally elongate pocket and a second generally elongate pocket open to one of said surfaces thereof, *said first and second pockets being elongated in a direction parallel to said one surface and* said first pocket being located adjacent one of said side walls, said second pocket being located adjacent the other of said side walls, and a plurality of holes extended vertically through said body adapted to accommodate pins having ends projected from the body, said holes having opposite ends open to said top and bottom surfaces, at least one hole located adjacent said first pocket, at least another hole located adjacent said second pocket, a neck joined to the side walls and extended rearwardly therefrom, and a head joined to the neck, said head having at least one ear projected laterally outward from one side of the neck.

12. The wall block of claim 11 wherein: said front face has a plurality of grooves.

13. The wall block of claim 12 wherein: said grooves are generally vertical grooves.

14. The retaining wall block of claim 11 wherein: said pockets are larger than the holes and extend outwardly toward opposite portions of the front face of said body.

15. The retaining wall block of claim 11 wherein: said pockets are larger than the holes and extend outwardly toward opposite portions of the front face of said body, each of said pockets having inner ends, said holes comprising a first hole located adjacent the inner end of said first pocket and a second hole located adjacent the inner end of the second pocket.

16. The wall block of claim 15 including:

a recess open to the bottom surface of the body spaced inwardly from said front face thereof, an opening vertically through said body spaced inwardly from said recess, a web separating said recess from said opening, said holes being located through said web, said pockets being located adjacent opposite ends of said web.

17. The retaining wall block of claim 11 wherein: each of said pockets has an arcuate shape larger than the holes and extends outwardly toward the front face of the body.

18. The wall block of claim 11 wherein: the entire block is made of concrete.

19. A retaining wall block comprising:

a body having opposite end portions, a [convex curved] front face having opposite ends, a top surface, a bottom surface, and side walls extended between said top and bottom surfaces rearwardly from said opposite ends of the front face, said side walls converging inwardly from said opposite [sides] *ends* of the front face, *said block having a lateral direction defined by a line extending through said opposite ends of said front face,* said body having hole means [in the opposite end portions open to the top surface thereof, said hole means] including a first pair of *laterally spaced* holes [spaced away from and adjacent one of said side walls and inwardly of said front face,] and a second pair of *laterally spaced* holes [spaced from and adjacent the other of said side walls and located inwardly of said front face], [at least one] *of said first and second pairs of holes being open to said top surface and at least the other of said first and second pairs of holes being open to said bottom surface, the lateral distance between said first pair of holes being less than the lateral distance between said second pair of holes and each* hole of said first and second pairs of holes adapted to accommodate separate pins extended vertically into said body to interlock the block with adjacent similar retaining wall blocks.

20. The wall block of claim 19 wherein: said front face has a plurality of grooves.

21. The wall block of claim 20 wherein: said grooves are generally vertical grooves.

22. The wall block of claim 19 wherein[:] *the holes of one of* said [hole means includes a pair of holes] *first and second pairs of holes are* open *only* to *one of* the top [surface] *and bottom surfaces* of the body.

23. The retaining wall block of claim 19 including: a neck joined to the side walls and extended rearwardly therefrom, and a head joined to said neck, said head having ears projected laterally outwardly from opposite sides of the neck.

24. The wall block of claim 23 including: an opening through said neck and head.

25. The wall block of claim 23 including: an opening through said body.

26. The wall block of claim 25 wherein: said opening has a generally trapezoidal shape.

27. The wall block of claim 23 wherein: said body has a first opening extended vertically therethrough, said neck and head having a second opening extended vertically therethrough, and a web separating the first opening from the second opening.

28. The wall block of claim 27 wherein: said first opening has a generally trapezoidal shape and second opening has a generally rectangular shape.

29. The wall block of claim 23 wherein: said head has side walls linearly aligned with the side walls of the body.

30. The wall block of claim 19 including: wall means connected to the opposite end portions of the body and extended rearwardly therefrom, said wall means comprising a first wall extended rearwardly from one end portion of the body, and a second wall extended rearwardly from the other end portion of the body.

31. A retaining wall block comprising:

a body having *opposite end portions,* a [convex curved] front face having opposite ends, a top surface, a bottom surface, and [opposite end portions having] side walls extended between said top and bottom surfaces rearwardly from said opposite ends of the front face, said side walls converging inwardly from said opposite ends of the front face, *said block having a lateral direction defined by a line extending through said opposite ends of said front face,* said body having hole means [open to the top surface thereof, said hole means] including a first pair of *laterally spaced* holes [spaced away from and adjacent one of said side walls and inwardly of said front face,] and a second pair of *laterally spaced* holes [spaced away from and adjacent and inwardly of said front face], at least one *of said first and second pairs of holes being open to said top surface and at least the other of said first and second pairs of holes being open to said bottom surface, the lateral distance between said first pair of holes being less than the lateral distance between said second pair of holes and each* hole of said first and second pairs of holes adapted to accommodate separate pins extended vertically into said block to interlock the block with adjacent similar retaining wall blocks, and [wall means connected to the body adjacent said side wall and extended inwardly from each side wall] *wherein at least a portion of each hole of said first and second pairs of holes intersects a straight line extending in a lateral direction.*

32. The wall block of claim 31 wherein: said front face has a plurality of general vertical grooves.

33. The wall block of claim 31 wherein: said first pair of holes includes first holes open to the top surface of the body, and said second pair of holes includes second holes open to the top surface of the body.

34. The wall block of claim 31 wherein: said side walls converge inwardly toward each other, and said wall means comprising a first wall extended rearwardly from one end portion of the body and a second wall extended rearwardly from the other end portion of the body.

35. A retaining wall block comprising: a body including a front face having opposite ends, a generally flat first surface, a generally flat second surface laterally spaced from and extended generally parallel to the first surface, and side walls extended between said first and second surfaces, said side walls converging inwardly toward each other from said opposite ends of the front face, said first surface of the body having recess means adapted to accommodate pin means to interlock the block with adjacent similar retaining wall blocks, said recess means comprising a first generally elongate recess spaced inwardly of the front face and located adjacent one side wall, and a second generally elongate recess spaced inwardly of the front face and located adjacent other side wall, a first hole located adjacent the first recess extended into said body between said first and second surfaces, and a second hole located adjacent the second recess extended into said body between said first and second surfaces, said first and second holes adapted to accommodate pins having ends projected from the body extended into said block to interlock with adjacent similar retaining wall blocks locatable on top of said wall block whereby the ends of the pins projected from the body are adapted to extend into recess means of the adjacent similar retaining wall blocks and locate the front faces of the adjacent retaining wall blocks offset inwardly of the front face of the retaining wall block.

36. The retaining wall block of claim 35 wherein: said first and second recesses are in general transverse alignment with each other.

37. The retaining wall block of claim 35 wherein: the body is a one-piece concrete unit.

38. The retaining wall block of claim 35 wherein: the first and second holes are in general transverse alignment with each other.

39. The retaining wall block of claim 35 wherein: said front face has a non-smooth face pattern.

40. The wall block of claim 35 wherein: the first and second recesses are in general transverse alignment with each other, and the first and second holes are in general transverse alignment with each other, said first and second recesses and first and second holes are laterally spaced relative to each other.

[41. A retaining wall block comprising: a body including a front face having opposite ends, a generally flat first surface, a generally flat second surface laterally spaced from and extended generally parallel to the first surface, and side walls extended between said first and second surfaces, said side walls extended inwardly toward each other from said opposite ends of the front face, a rear wall extended between said first and second surfaces joined to said side walls, said rear wall having a length smaller than the length of the front face, said first surface of the body having recess means adapted to accommodate pin means to interlock the block with an adjacent retaining wall block, and hole means located adjacent the recess means extended into said body between said first and second surfaces adapted to accommodate pin means having an end projected from the body extended into said block to interlock with an adjacent retaining wall block having a front face locatable in a different horizontal plane than the retaining wall block whereby the end of the pin means projected from the body is adapted to extend into recess means of an adjacent retaining wall block and locate the front face of the adjacent wall block offset inwardly of the front face of the retaining wall block.]

[42. The retaining wall block of claim 41 wherein: the body is a one-piece concrete unit.]

43. [The] *A* retaining wall block [of claim 41] *comprising:*

*a body including a front face having opposite ends, a generally flat top surface, a generally flat bottom surface spaced from and extended generally parallel to the top surface and side walls extended between said top and bottom surfaces, said side walls extended inwardly toward each other from said opposite ends of the front face, a rear wall extended between said top and bottom surfaces joined to said side walls, said rear wall having a length smaller than the length of the front face, one of said top and bottom surfaces of the body having recess means adapted to accommodate pin means to interlock the block with an adjacent retaining wall block, and hole means located adjacent the recess means extended into said body between said top and bottom surface adapted to accommodate pin means having an end projected from the body extended into said block to interlock with an adjacent retaining wall block having a front face locatable in a different vertical plane than the retaining wall block whereby the end of the pin means projected from the body is adapted to extend into recess means of an adjacent retaining wall block and locate the front face of the vertically adjacent wall block offset inwardly of the front face of the retaining wall block,* wherein [:] the front face has a convex curved shape and one of said side walls extends linearly between said rear wall and one end of the front face.

*44. A retaining wall block comprising:*

*a body including a front face having opposite ends and top and bottom edges and a length defined by the distance between said opposite ends, a top surface, a bottom surface spaced from and extending generally parallel to said top surface, said top and bottom surfaces extending rearwardly from said top and bottom edges, and side walls extending between said first and second surfaces and rearwardly and inwardly from said opposite ends of the front face, interlock means for interlocking adjacent retaining wall blocks with one another, a neck joined to the side walls and extending rearwardly therefrom, said neck having a length dimension measured in a direction perpendicular to the length of said front face and a lateral dimension measured in a direction parallel to the length of said front face in which the lateral dimension of said neck along the entirety of said length dimension is smaller than the length of said front face, a head joined to the rearward end of said neck and having a lateral dimen-*

*sion measured in a direction parallel to the length of said front face in which the lateral dimension of said head is greater than the lateral dimension of said neck and less than the length of said front face and an opening extending through at least a portion of said neck and through at least one portion of said head.*

* * * * *